United States Patent [19]

Cross

[11] Patent Number: 4,506,629
[45] Date of Patent: Mar. 26, 1985

[54] METHOD OF REPAIRING DAMAGED ENTRANCE TO A BIRDHOUSE

[76] Inventor: Bert S. Cross, Box 3806, Tequesta, Fla. 33458

[21] Appl. No.: 524,986

[22] Filed: Aug. 22, 1983

[51] Int. Cl.³ .............................................. A01K 31/00
[52] U.S. Cl. ...................................................... 119/23
[58] Field of Search ........................... 119/23; 215/355

[56] References Cited

U.S. PATENT DOCUMENTS

| | | | |
|---|---|---|---|
| 1,166,100 | 12/1915 | White | 119/23 |
| 2,537,232 | 1/1951 | Nottingham | 215/355 |
| 3,182,634 | 5/1965 | Myaida et al. | 119/23 |
| 3,250,249 | 5/1966 | Nelson et al. | 119/23 |
| 3,643,631 | 2/1972 | Wade et al. | 119/23 |
| 4,166,432 | 9/1979 | Moore | 119/23 |

FOREIGN PATENT DOCUMENTS 2040662 9/1980 United Kingdom .................. 119/23

Primary Examiner—Gene Mancene
Assistant Examiner—Kris R. Schulze
Attorney, Agent, or Firm—Kinney & Lange

[57] ABSTRACT

A device is used to repair a damaged entrance to a birdhouse and to provide a new entrance into a birdhouse. The device includes a body having first and second oppositely facing spaced-apart surfaces with first surface being sufficiently large to cover the damage entrance to the birdhouse. An aperture extending through the body between the first and second surfaces. The body is attachable proximate the damaged entrance such that the first surface covers the damaged entrance and the aperture defines a new entrance into the birdhouse.

3 Claims, 5 Drawing Figures

U.S. Patent  Mar. 26, 1985  4,506,629
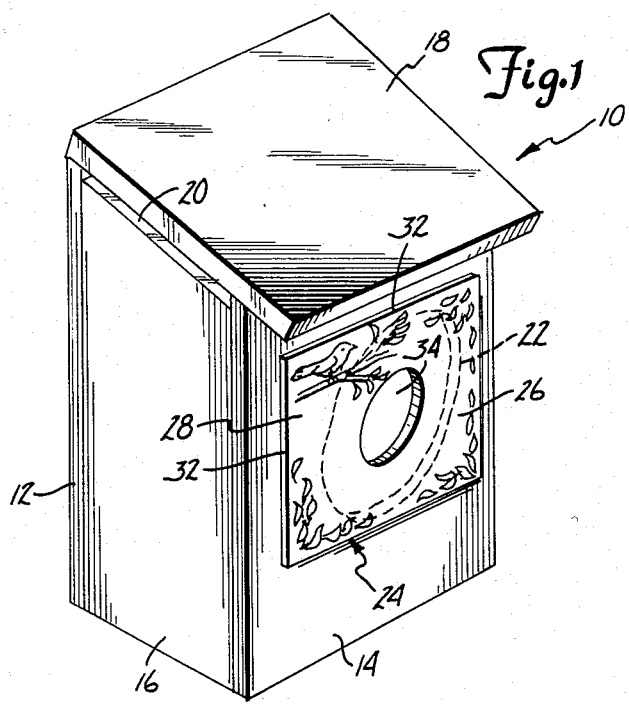
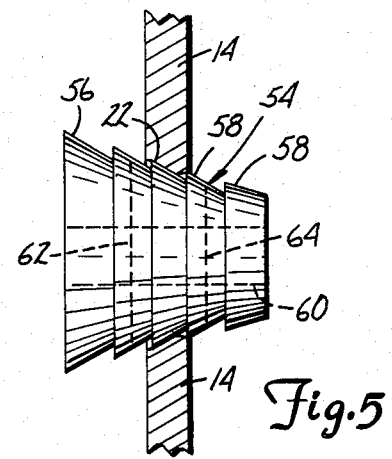
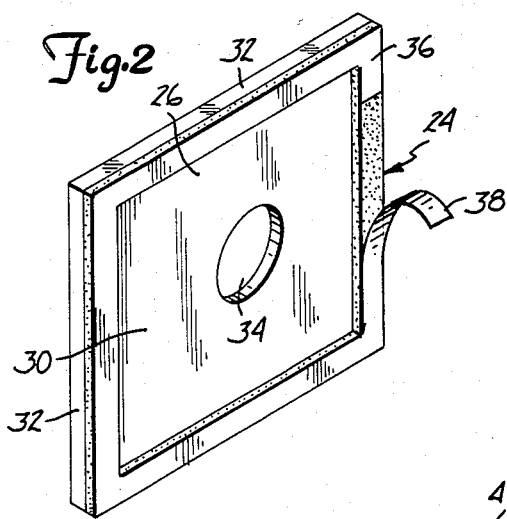
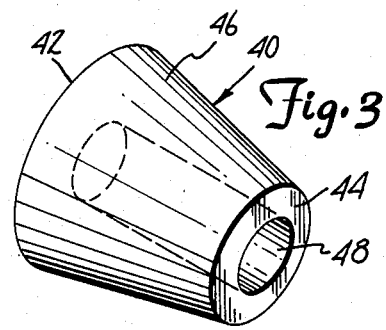
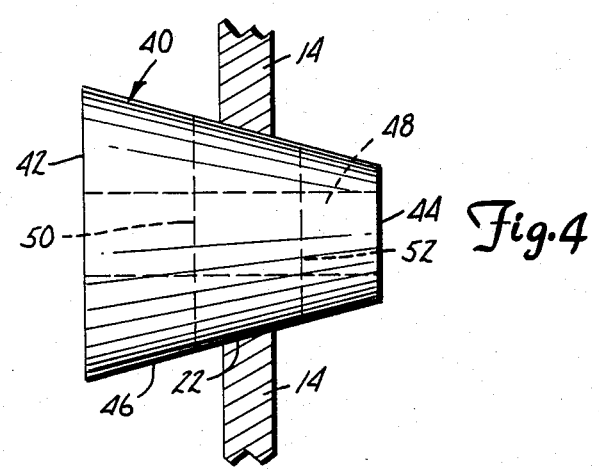

METHOD OF REPAIRING DAMAGED ENTRANCE TO A BIRDHOUSE

BACKGROUND OF THE INVENTION

1. Field of the Invention

The present invention relates to a method of repairing damaged entrances of birdhouses and providing new entrance into the nesting cavity of a birdhouse.

2. Description of the Prior Art

Birdhouses that provide a suitable nesting site for nesting birds have become very popular. Typically, the birdhouses are made of wood and have an entrance that permits the bird entry into the nesting cavity. The entrance of the birdhouse is usually of a size that attracts a particular specie or species of birds.

Often times, the birdhouses are situated in areas that have a squirrel population. Squirrels out of curiosity, seeking a nesting area, or for other reasons not known, attempt to enter the birdhouse. Often times, the hole diameter is not large enough to accommodate the squirrel. The squirrel then gnaws and chews the entrance until the entrance is large enough for the squirrel to enter the birdhouse. The size of the entrance that accommodates a squirrel is generally too large for preference by the specie or species of bird that the house was intended for and the birdhouse becomes worthless. The vandalism resulting from squirrels enlarging entrances to birdhouses is quite costly since birdhouses are relatively expensive.

The Myaida et al U.S. Pat. No. 3,182,634, granted on May 11, 1965, shows a birdhouse having an obstructed entrance that protects the contents of the nest from large birds, such as starlings, cats, squirrels and the like. A landing is disposed below the entrance and a partition is spaced from the entrance obstructing entry into the interior of the birdhouse. However, a squirrel can still gnaw its way into the birdhouse.

The Wade et al U.S. Pat. No. 3,643,631, granted on Feb. 22, 1972, shows a metal birdhouse with a double-wall construction with insulation between the double walls. The entry opening can be varied in size for different species of birds by attaching various rings to the entry opening with each ring having a different inside diameter. However, the metal birdhouse of the Wade et al Patent is expensive and it does not solve the problem of birdhouses already in existence made of wood that have been or can be damaged by squirrels.

The Nelson et al U.S. Pat. No. 3,250,249, granted on May 10, 1966, shows a collapsible birdhouse made of weatherproof, corrugated paperboard or similar material that is assembled by the user. The birdhouse has a selectable doorway opening which permits the user to select the specie of bird that the user desires as an occupant of the house. In one embodiment, a circular disk having a plurality of different size holes is positioned proximate the entryway of the birdhouse, permitting the user to revolve the disk and position different holes in front of the entryway. However, a squirrel can still gnaw through the opening selected by the user leaving the birdhouse in an uninhabitable state for the specie of bird desired.

The White U.S. Pat. No. 1,166,100, granted on Dec. 28, 1915, shows a birdhouse having an opening of sufficient size to admit birds of the largest species that are accommodated by the interior of the birdhouse. The entryway is guarded by a metal plate which is preferably an integral part of the house. A series of intermediate plates are pivotally attached to the integral plate, with each plate having a different sized hole smaller than the hole of the integral plate. The user can then select the hole for the species of bird desired by pivoting the plates. The birdhouse of the White Patent, although preventing squirrels from gnawing the hole to a larger size, does not provide for repairing existing birdhouses.

SUMMARY OF THE INVENTION

The present invention is concerned with repairing a damaged entrance to a nesting cavity of a birdhouse using a device which is attachable proximate the damaged entrance of the birdhouse and provides a new entrance of a size preferred by the specie of bird desired. The device includes a body having first and second oppositely facing spaced-apart surfaces and at least one perimeter wall surface connecting the first and second surfaces. An aperture extends through the body between the first and second surfaces. Means are included for attaching the body to the birdhouse proximate the damaged entrance. The first surface of the body is sufficiently large to cover the damaged entrance so that when the device is attached to the birdhouse, the first surface covers the damaged entrance and the aperture defines a new opening to the nesting cavity within the birdhouse.

BRIEF DESCRIPTION OF THE DRAWINGS

FIG. 1 is a perspective view of a birdhouse with a preferred embodiment of a device of the present invention being attached to the birdhouse proximate a damaged entrance.

FIG. 2 is a perspective view of a backside of the preferred embodiment of the device.

FIG. 3 is a perspective view of an alternative embodiment of the device of the present invention.

FIG. 4 is a sectional view of an entrance of a birdhouse illustrating the device of FIG. 3 attached thereto.

FIG. 5 is a sectional view of a damaged entrance of a birdhouse with still another alternative embodiment of the device of the present invention fitted into the damaged entrance.

DETAILED DESCRIPTION OF THE PREFERRED EMBODIMENTS

A birdhouse, generally indicated at 10, of typical configuration is illustrated in FIG. 1. The birdhouse 10 has a back wall 12, a front wall 14, and side walls 16 (one side wall not being shown). A roof 18 is attached to the top of the back wall 12 and front wall 14 and is spaced from the side walls 16 defining an air vent 20. A floor (not shown) is attached proximate the bottom ends of the back wall 12, front wall 14 and side walls 16. The back, front and side walls, roof and floor define a nesting cavity wherein the bird builds its nest, lays its eggs, and feeds and cares for the nestlings that hatch.

The birdhouse illustrated in FIG. 10 is built of wood, a material commonly used for most birdhouses. Wood is a good insulator and protects the nestlings within the birdhouse from summertime heat. Although wood is a popular building material for birdhouses, being relatively inexpensive and a good insulator, it is easily gnawed and chewed by squirrels and the like. Squirrels, out of curiosity, or seeking a cavity for nesting purposes, will gnaw and chew the smaller entrance into the birdhouse to a size that permits the squirrel to enter. The result is an entrance that permits squirrels to inhabit the birdhouse and discourages desired species of birds from building their nests within the cavity of the birdhouse. A damaged entrance is indicated by broken lines 22 in FIG. 1.

A preferred embodiment of the present invention is generally indicated at 24 in FIGS. 1 and 2. The device includes a panel 26 having an exterior surface 28, an interior surface 30, and side edge portions 32 which define the perimeter of the panel member 26. Preferably, the panel member 26 is made of a material that resists gnawing or chewing by squirrels. The material can be either metal, a hard plastic such as a phenolic resin, or other materials that are harder than wood, such as a ceramic or cement.

The panel 26 has an aperture 34 which defines an entrance for a bird to enter the cavity of the birdhouse. The diameter of the entrance varies depending on the particular species of bird desired within the birdhouse. Preferably, the diameter of the aperture 34 is sufficiently small to prevent a squirrel from entering the birdhouse but large enough to allow the desired specie of bird to enter. For example, a one and one-half (1½) inch opening is desirable for a bluebird, a one and one-eighth (1⅛) inch opening is desirable for a chickadee, and a one (1) inch opening is desirable for a wren.

To secure the panel member 26 onto the front wall 14 of the birdhouse and to cover the damaged opening 22, a strip of a commercially-available adhesive 36 is provided proximate the edge of side walls 32, as illustrated in FIG. 2. The adhesive is of a type that will secure the panel member 26 to a painted or unpainted wall 14 in an outdoor environment. As illustrated in FIG. 2, the adhesive is provided in the layer along the perimeter of the panel member 26 which is defined by the side edge wall portions 32. In a preferred embodiment, the adhesive is initially protected by a peel-away protective sheeting 38, allowing the user to merely peel away the protective sheeting 38 and immediately attach the panel member 26 to the front wall 14 and cover the damaged entrance 22.

The panel member 26 on the front surface 28 preferably has decorative characters or the like, making the front surface of the device 24 esthetically pleasing.

As will be understood, the device 24 can be used for any type of configuration of birdhouse and is not limited to the single slope roof configuration illustrated in FIG. 1. For example, the device 24 can be used to repair a damaged entrance of a birdhouse having a gable-type roof construction.

An alternative embodiment of the device of the present invention is generally indicated at 40 in FIGS. 3 and 4. The embodiment 40 is of a generally frusto-conical configuration having a front wall surface 42, a back wall surface 44 and a conical side wall 46. An aperture 48 defines the new entrance into the birdhouse when the embodiment is attached thereto. The embodiment 40 fits a range of sizes of damaged entrances due to the conical configuration of the side wall.

As illustrated in FIG. 4, the embodiment 40 is inserted into the damaged entrance 22 with the side wall 46 frictionally engaging the edges of the damaged entrance 22. The embodiment 40 is then cut in a direction transverse to its axis generally along a plane indicated by broken line 50 at a point wherein the diameter is larger than the damaged entrance 22. The embodiment 40 is also cut generally along a plane indicated by broken line 52 by removing the embodiment 40 and cutting along the line 52 at a point having a diameter less than the diameter of the damaged entrance 22. The embodiment 40 is then inserted into the damaged entrance 22 repairing the damaged entrance 22 and providing a new entrance defined by the aperture 48.

The embodiment 40 is made preferably from wood since wood is easy to cut but can be made of other cuttable material such as plastic. If the aperture 48 of the embodiment 40 is damaged by squirrels enlarging the aperture 48, the embodiment 40 is simply taken out of the damaged entrance 22 and a new embodiment 40 inserted as previously described above.

A further alternative embodiment is generally indicated at 54 in FIG. 5. The embodiment 54 is also of a generally frusto-conical configuration. The embodiment 54 has a side wall 56 having a plurality of annular ridges 58 that provide a frictional grip when the embodiment 54 is inserted into the damaged entrance 22. The alternative embodiment 54 has an entrance defined by an aperture 60 and is inserted into the damaged entrance 22 in a similar manner as described with reference to the embodiment 40 illustrated in FIGS. 3 and 4. The embodiment 54 is also cut generally along a front plane indicated by broken line 62 and a back plane indicated by broken line 64 as also previously described with reference to the embodiment 40 in FIGS. 3 and 4.

The device of the present invention provides a solution to repairing birdhouses having entrances damaged by squirrels. If the squirrels manage to chew a new entrance into the device of the present invention, the device can be easily removed and a new device placed over the damaged entrance. The device of the present invention is easy to use, requiring very little work on the part of the user to repair the birdhouse.

Although the present invention has been described with reference to preferred embodiments, workers skilled in the art will recognize that changes may be made in form and detail without departing from the spirit and scope of the invention.

What is claimed is:

1. A method of repairing a damaged entrance to the nesting cavity of a birdhouse, having a chewed out opening of a range of sizes, the method comprising:
   providing a body having first and second spaced-apart oppositely facing surfaces, the first surface being appreciably larger than the second surface, and a tapered side wall surface extending from the first surface to the second surface to provide a body of frusto-conical shape, said body having an aperture extending therethrough between the oppositely facing surfaces and of a size to admit the desired species of bird but small enough to exclude squirrels and larger birds, and
   inserting said body into the damaged entrance of a birdhouse so that the conical side wall surface frictionally engages the edges of the damaged entrance of the birdhouse, the body being retained within the entrance to the birdhouse, the aperture in the body defining a new smaller entrance to the nesting cavity of the birdhouse of a size to admit the desired species of bird.

2. The method of claim 1 in which the body is initially loosely inserted into the opening to determine the amount of material necessary for filling the damaged opening, the plug is then removed, the excess material of both the inner and outer portions of the body is cut off, and the body is reinserted into the opening.

3. The method of claim 1 in which the body has a plurality of annular ridges to increase the frictional engagement of the body with the sides of the opening.

* * * * *